United States Patent
Kim et al.

(10) Patent No.: US 10,663,781 B2
(45) Date of Patent: May 26, 2020

(54) DISPLAY DEVICE AND MANUFACTURING METHOD THEREOF

(71) Applicant: Samsung Display Co., Ltd., Yongin-si, Gyeonggi-do (KR)

(72) Inventors: Si Kwang Kim, Yongin-si (KR); Joo Young Yoon, Yongin-si (KR); Seung Yeon Chae, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 189 days.

(21) Appl. No.: 15/791,654

(22) Filed: Oct. 24, 2017

(65) Prior Publication Data

US 2018/0129094 A1 May 10, 2018

(30) Foreign Application Priority Data

Nov. 4, 2016 (KR) .......................... 10-2016-0147007

(51) Int. Cl.
*G02F 1/1333* (2006.01)
*G02F 1/1335* (2006.01)
*G02F 1/1362* (2006.01)
*G02F 1/13357* (2006.01)

(52) U.S. Cl.
CPC ...... *G02F 1/133305* (2013.01); *G02F 1/1362* (2013.01); *G02F 1/133345* (2013.01); *G02F 1/133516* (2013.01); *G02F 1/133617* (2013.01); *G02F 2001/133354* (2013.01); *G02F 2001/133519* (2013.01)

(58) Field of Classification Search
None
See application file for complete search history.

(56) References Cited

U.S. PATENT DOCUMENTS

| | | | |
|---|---|---|---|
| 7,067,976 B2 | 6/2006 | Yamazaki | |
| 7,880,828 B2 | 2/2011 | Shin et al. | |
| 9,366,912 B2 | 6/2016 | Lim et al. | |
| 9,519,186 B2 | 12/2016 | Lee et al. | |
| 2007/0097292 A1* | 5/2007 | Clark | G02F 1/133377 349/86 |
| 2011/0032469 A1* | 2/2011 | Lee | G02F 1/133377 349/187 |
| 2013/0242228 A1* | 9/2013 | Park | G02F 1/133617 349/61 |

(Continued)

FOREIGN PATENT DOCUMENTS

| | | |
|---|---|---|
| KR | 10-0849481 B1 | 7/2008 |
| KR | 10-0884218 B1 | 2/2009 |

(Continued)

*Primary Examiner* — Ryan Crockett
(74) *Attorney, Agent, or Firm* — Lewis Roca Rothgerber Christie LLP (57) ABSTRACT

According to an embodiment of the present disclosure, a display device includes a light source, a first substrate on the light source, a liquid crystal layer on the first substrate, and a second substrate on the liquid crystal layer, wherein the first substrate or the second substrate includes a base substrate, an insulating layer on the base substrate, and partially defining a first cavity and a second cavity having openings facing different directions, a first quantum dot in the first cavity, a second quantum dot in the second cavity, and a cover layer covering the openings of the first and second cavities.

8 Claims, 4 Drawing Sheets

(56) References Cited

U.S. PATENT DOCUMENTS

| | | | | |
|---|---|---|---|---|
| 2014/0152948 A1* | 6/2014 | Chae | ............... | G02F 1/133345 |
| | | | | 349/110 |
| 2014/0267984 A1* | 9/2014 | Lim | ............... | G02F 1/133377 |
| | | | | 349/86 |
| 2014/0268000 A1* | 9/2014 | Lim | ............... | G02F 1/1339 |
| | | | | 349/153 |
| 2014/0293193 A1* | 10/2014 | Lim | ............... | G02F 1/133377 |
| | | | | 349/86 |
| 2014/0354922 A1* | 12/2014 | Sung | ............... | G02F 1/1334 |
| | | | | 349/92 |
| 2015/0234215 A1* | 8/2015 | Kim | ............... | G02F 1/1341 |
| | | | | 349/43 |
| 2016/0195775 A1* | 7/2016 | Lee | ............... | G02F 1/1368 |
| | | | | 349/43 |
| 2016/0202518 A1* | 7/2016 | Kwon | ............... | G02F 1/133377 |
| | | | | 349/43 |
| 2016/0209572 A1* | 7/2016 | Cho | ............... | G02B 6/0026 |
| 2016/0306222 A1* | 10/2016 | Hong | ............... | G02F 1/133377 |
| 2016/0306226 A1* | 10/2016 | Yoon | ............... | G02F 1/133377 |
| 2016/0320661 A1* | 11/2016 | Lim | ............... | G02F 1/13394 |
| 2017/0222096 A1* | 8/2017 | Fan | ............... | H01L 33/486 |
| 2017/0227813 A1* | 8/2017 | Park | ............... | G02F 1/133514 |
| 2018/0011231 A1* | 1/2018 | Jiang | ............... | G02F 1/1335 |
| 2018/0101056 A1* | 4/2018 | Lee | ............... | G02F 1/133617 |

FOREIGN PATENT DOCUMENTS

| | | |
|---|---|---|
| KR | 10-1109800 B1 | 3/2012 |
| KR | 10-2014-0111874 A | 9/2014 |
| KR | 10-2015-0080135 A | 7/2015 |
| KR | 10-2015-0116024 A | 10/2015 |

\* cited by examiner

DISPLAY DEVICE AND MANUFACTURING METHOD THEREOF

CROSS-REFERENCE TO RELATED APPLICATION

This application claims priority to, and the benefit of, Korean Patent Application No. 10-2016-0147007 filed in the Korean Intellectual Property Office on Nov. 4, 2016, the entire contents of which are incorporated herein by reference.

BACKGROUND

1. Field

Embodiments of the present disclosure relate to a display device and a manufacturing method thereof.

2. Description of the Related Art

In general, a liquid crystal display (LCD) is a display device that obtains a desired image signal by applying an electric field whose intensity is controlled to a liquid crystal that has a dielectric anisotropy and that is formed between two substrates to adjust an amount of light that is transmitted through a substrate. This liquid crystal display includes two substrates, a liquid crystal layer formed therebetween, two polarizers attached to each of the two substrates, a backlight unit for providing light to the two substrates, a color conversion layer for changing a wavelength of the light emitted from the backlight unit, and the like.

When the color conversion layer is formed, it may be suitable to prevent color mixture or the like from occurring to maintain an image quality output by the display device. Accordingly, there is a need for the color conversion layer in which color mixture or the like does not occur.

SUMMARY

An embodiment of the present disclosure provides a display device including a quantum dot in a cavity, and a manufacturing method thereof.

According to an embodiment of the present disclosure, a display device includes a light source, a first substrate on the light source, a liquid crystal layer on the first substrate, and a second substrate on the liquid crystal layer, wherein the first substrate or the second substrate includes a base substrate, an insulating layer on the base substrate, and partially defining a first cavity and a second cavity having openings facing different directions, a first quantum dot in the first cavity, a second quantum dot in the second cavity, and a cover layer covering the openings of the first and second cavities.

The first substrate or the second substrate may include a first pixel region, a second pixel region, and a third pixel region, wherein the first cavity is in the first pixel region, and wherein the second cavity is in the second pixel region.

The first cavity and the second cavity may extend in a first direction, wherein the opening of the first cavity faces the first direction, and wherein the opening of the second cavity faces a second direction, which is opposite to the first direction.

The insulating layer may include a plurality of injection columns extending in a third direction crossing the first and second directions, wherein the first cavity and the second cavity are between adjacent ones of the injection columns.

The opening of the first cavity and the opening of the second cavity may be adjacent to each other and may be directed to different ones of the injection columns.

The light source may be configured to emit light having a first wavelength band, wherein the first quantum dot is configured to absorb light having the first wavelength band and to emit light having a second wavelength band that is different from the first wavelength band, and wherein the second quantum dot is configured to absorb light having the first wavelength band and to emit light having a third wavelength band that is different from the first wavelength band.

The first wavelength band may about 450 nm to about 495 nm, the second wavelength band may be about 495 nm to about 570 nm, and the third wavelength band may be about 620 nm to about 750 nm.

The insulating layer may include a transparent photoresist layer.

The display device may further include a light-blocking layer on the second substrate, an overcoat layer on the light-blocking layer, and a window on the overcoat layer.

According to an embodiment of the present disclosure, a manufacturing method of a display device includes providing a first substrate, providing a second substrate, and forming a liquid crystal layer between the first substrate and the second substrate, wherein providing the first substrate or providing the second substrate includes providing a base substrate, forming an insulating layer that partially defines a first cavity and a second cavity having openings facing different directions on the base substrate, providing a first quantum dot in the first cavity, providing a second quantum dot in the second cavity, and forming a cover layer for covering the openings on the insulating layer.

Forming the first cavity and the second cavity may include forming a sacrificial layer on the base substrate, patterning the sacrificial layer to correspond to a shape of the first cavity and the second cavity, forming the insulating layer on the sacrificial layer, and removing the sacrificial layer.

The sacrificial layer may be patterned such that the first cavity and the second cavity extend in a first direction, wherein the opening of the first cavity faces the first direction, and wherein the opening of the second cavity faces a second direction that is opposite to the first direction.

The insulating layer may include a plurality of injection columns extending in a third direction crossing the first and second directions, wherein the sacrificial layer is formed between the injection columns.

The opening of the first cavity and the opening of the second cavity, which are adjacent to each other, may be directed to different ones of the injection columns.

The injection columns may include a first injection column and a second injection column, wherein providing the first quantum dot and the second quantum dot includes injecting the first quantum dot into the first cavity by providing the first quantum dot in the first injection column adjacent to the first cavity, and injecting the second quantum dot into the second cavity by providing the second quantum dot in the second injection column that adjacent to the second cavity.

The first quantum dot and the second quantum dot may be respectively injected from the first injection column and the second injection column into the first cavity and the second cavity in a vacuum state.

The manufacturing method may further include providing a light source for emitting blue light.

An embodiment of the present disclosure provides a display device capable of improving an area and improving a capacity of a capacitor electrode while reducing or preventing a short between layers due to a reduction in a thickness of an insulating layer.

DETAILED DESCRIPTION

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. In addition, it will also be understood that when an element or layer is referred to as being "between" two elements or layers, it can be the only element or layer between the two elements or layers, or one or more intervening elements or layers may also be present.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented using any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
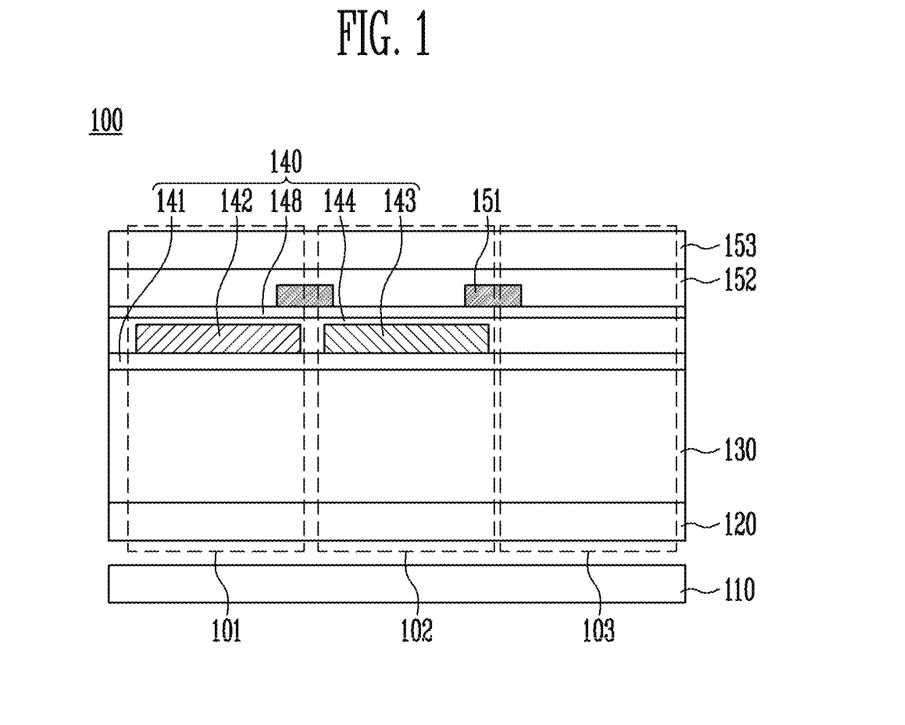
FIG. 1 is a cross-sectional view illustrating a display device according to an embodiment of the present disclosure.

FIG. 1 is a cross-sectional view illustrating a display device according to an embodiment of the present disclosure.

Referring to FIG. 1, a display device 100 according to an embodiment of the present disclosure includes a light source 110, a first substrate 120, a liquid crystal layer 130, a second substrate 140, a light-blocking layer 151, an overcoat layer 152, and a window 153.

Hereinafter, above elements will be described in more detail.

According to an embodiment of the present disclosure, the display device 100 includes a light source 110. A suitable illuminant may be used as the light source 110. The light source 110 emits light transmitted through the display device 100 so that the display device 100 may output an image. The light source 110 may emit light having color corresponding to at least one of red, blue, green, yellow, and white. In addition, the light source 110 may emit not only light in a visible band, but may also emit light in an ultraviolet band or in an infrared band. However, according to an embodiment of the present disclosure, the light source 110 may emit blue light.

In other embodiments, a plurality of light sources 110 may exist. When a plurality of light sources 110 exist, light sources 110 may emit light of the same color or may emit light of different colors. The light source 110 may include a light emitting diode (LED), an organic electroluminescent thin film, an inorganic electroluminescent thin film, or the like. In addition, the light source 110 may include a compound semiconductor having a two-element or three-element structure, the elements being selected from 2B, 3B, 4A, 4B, 5B, and 6B groups, examples of which including silicon carbide (SiC), gallium arsenide (GaAs), gallium phosphide (GaP), gallium-arsenic-phosphorous ($GaAs_{1-x}P_x$), gallium-aluminum-arsenic ($Ga_{1-x}Al_xAs$), indium phosphide (InP), indium gallium phosphide ($In_{1-x}Ga_xP$), and the like.

A first substrate 120 may be provided on the light source 110. In the embodiment shown in FIG. 1, cavities and quantum dots are not provided in the first substrate 120. However, in alternative embodiments, cavities and quantum dots may be provided in the first substrate 120.

The first substrate 120 may be transparent to enable transmission of light emitted from the light source 110. For example, the first substrate 120 may be formed of a material selected from the group consisting of synthetic quartz, calcium fluoride, F-doped quartz, sodalime glass, non-alkali glass, resin, polystyrene, a polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, fiber glass reinforced plastic, and the like. However, a material of the first substrate 120 is not limited thereto.

The first substrate 120 may have flexibility. Therefore, the first substrate 120 may be bent or folded by an external force. In addition, the first substrate 120 may have a single-layer structure or may have a multi-layer structure.

A liquid crystal layer 130 may be provided on the first substrate 120. The liquid crystal layer 130 may include a plurality of liquid crystal molecules having dielectric anisotropy. A plurality of liquid crystal molecules included in the liquid crystal layer 130 may be arranged according to an electric field applied to the liquid crystal layer 130. The transmittance of light provided from the light source 110 is adjusted according to an arrangement of the liquid crystal molecules in the liquid crystal layer 130, and an image may be displayed. The liquid crystal molecules included in the liquid crystal layer 130 are not particularly limited. For example, a nematic liquid crystal, a cholesteric liquid crystal, a squeeze liquid crystal, a ferroelectric liquid crystal, or the like may be used as the liquid crystal layer 130.

A second substrate 140 may be provided on the liquid crystal layer 130. The second substrate 140 may include a base substrate 141. The base substrate 141 may be formed of a material selected from the group consisting of synthetic quartz, calcium fluoride, F-doped quartz, sodalime glass, non-alkali glass, resin, polystyrene, a polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, fiber glass reinforced plastic, and the like. The second substrate 140 including the base substrate 141 may have flexibility.

According to an embodiment of the present disclosure, the second substrate 140 may include the base substrate 141, a first cavity 142, a second cavity 143, an insulating layer 144, and a cover layer 148. The first cavity 142 and the second cavity 143 may be surrounded by the base substrate 141 and the insulating layer 144. Although only a single first cavity 142 and a single second cavity 143 are provide in FIG. 1, a plurality of first cavities 142 and/or second cavities 143 may be provided in other embodiments. Accordingly, a plurality of first cavities 142 and second cavities 143 may exist as suitable.

The first cavity 142 and the second cavity 143 may be provided in a first pixel region 101 and in a second pixel region 102, respectively. No cavity is provided in a third pixel region 103. The first cavity 142 and the second cavity 143 may be provided with a first quantum dot and with a second quantum dot, respectively. Because no cavity is provided in the third pixel region 103, no quantum dot is provided in the third pixel region 103. Accordingly, light emitted from the light source 110 may be emitted through the third pixel region 103 without any change of a wavelength of the light.

Therefore, the first pixel region 101, the second pixel region 102, and the third pixel region 103 may constitute one pixel unit. The pixel unit composed of the first pixel region 101, the second pixel region 102, and the third pixel region 103 may display various colors according to a voltage applied to the display device 100. For example, when green light is emitted from the first pixel region 101, red light is emitted from the second pixel region 102, and blue light is emitted from the third pixel region 103, then light emitted from the pixel unit may be visually recognized as white. A display device according to disclosed embodiments may include a plurality of pixel units including the first pixel region 101, the second pixel region 102, and the third pixel region 103.

The light source 110 may emit light having a first wavelength band. The first quantum dot may absorb the light having the first wavelength band, and then may emit light having a second wavelength band that is different from the first wavelength band. The second quantum dot may absorb the light having the first wavelength band, and then may emit light having a third wavelength band that is different from the first wavelength band.

For example, the first wavelength band may be about 450 nm to about 495 nm, the second wavelength band may be about 495 nm to about 570 nm, and the third wavelength band may be about 620 nm to about 750 nm. That is, when the light source 110 emits blue light, the insulating layer 144 may transmit the blue light as it is without color conversion in the quantum dot. In this case, the first quantum dot absorbs the blue light and emits the green light, and the second quantum dot absorbs the blue light and emits the red light. Therefore, according to an embodiment of the present disclosure, the display device 100 may display the red light, the green light, and the blue light even though it has only the first quantum dot for converting the blue light into the green light and the second quantum dot for converting the blue light into the red light. The first quantum dot and/or the second quantum dot may include a II-VI group quantum dot including Cd/Se/ZnS, CdSe/CdS/ZnS, ZnSe/ZnS and/or ZnTe/ZnSe, a III-V group quantum dot including InP/ZnS, or a quantum dot including CuInS(2)/ZnS. The first quantum dot and the second quantum dot may have a different size from each other.

When a color is displayed using a quantum dot, the color may be displayed more clearly. Specifically, light emitted from the quantum dot has a narrow emission line width to have high color purity. Therefore, by using the quantum dot, the color desired to be emitted can be accurately displayed.

The first cavity 142 and the second cavity 143 may have a that which does not deteriorate resolution of the display device 100. For example, the first cavity 142 and the second cavity 143 may have a width of about 60 μm to about 150 μm. The widths of the first cavity 142 and the second cavity 143 are related to the resolution of an image output by the display device 100. When the width of each of the first cavity 142 and the second cavity 143 is less than about 60 μm, an insufficient amount of quantum dots are provided in the first cavity 142 and the second cavity 143, such that color implementation capability may deteriorate. In addition, when the width of each of the first cavity 142 and the second cavity 143 is greater than about 150 μm, the resolution of the image output by the display device 100 may deteriorate.

The insulating layer 144 may include a transparent photoresist material. The insulating layer 144 may improve luminous efficiency of the display device 100. Specifically, a portion of the light emitted from the light source 110 may be scattered at the insulating layer 144, and the scattered light may be incident to the first cavity 142 or the second cavity 143. The light incident to the first cavity 142 or the second cavity 143 may be respectively converted by the first quantum dot or the second quantum dot, and may be then emitted again. Accordingly, the insulating layer 144 can improve the luminous efficiency of the display device 100.

The cover layer 148 may block openings of the first cavity 142 and the second cavity 143 after the quantum dots are injected into the first cavity 142 and the second cavity 143.

A light-blocking layer 151 may be provided on the second substrate 140. The light-blocking layer 151 may be between the first cavity 142 and the second cavity 143 in a plane view. The light-blocking layer 151 can reduce or prevent light combined through different quantum dots from being viewed by the user. The light-blocking layer 151 may include, chromium (Cr), carbon black, or the like, but is not limited thereto. Those skilled in the art may use a light-blocking layer 151 made of an organic material as needed.

An overcoat layer 152 may be provided on the light-blocking layer 151. The overcoat layer 152 makes a surface of the display device 100 flat. There is no particular limitation on a material that may be used for the overcoat layer 152. Those skilled in the art may use organic and/or inorganic materials to form the overcoat layer 152. The overcoat layer 152 may have an adhesive property at the interface.

A window 153 may be provided on the overcoat layer 152. The window 153 may be formed of various materials, such as a glass, a tempered glass, polymer resin, and the like. The window 153 functions to protect the display device 100 from an external impact. The window 153 may be folded or bent because it has flexibility.

Figure 2:
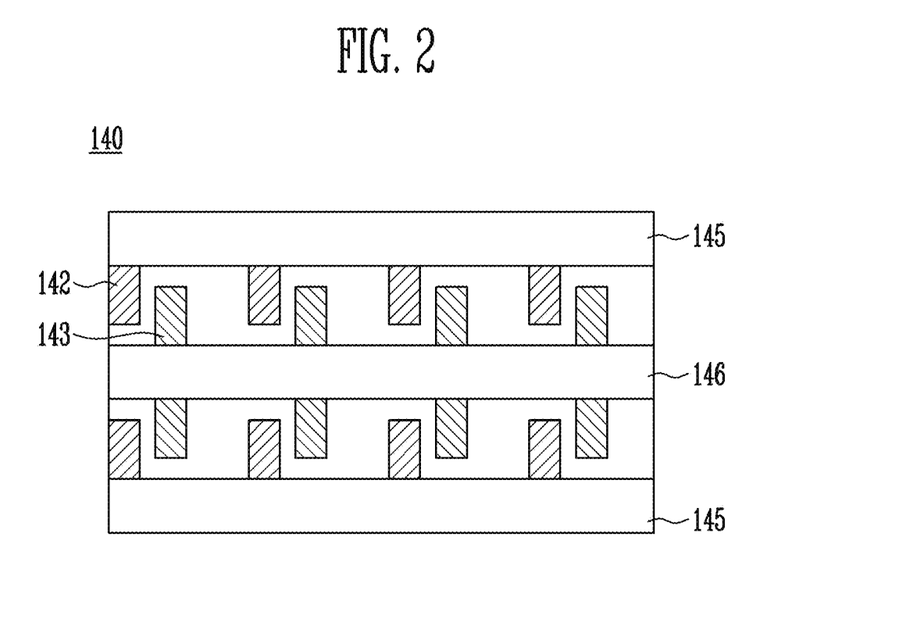
FIG. 2 is a plan view illustrating a second substrate according to an embodiment of the present disclosure.

FIG. 2 is a plan view illustrating a second substrate according to an embodiment of the present disclosure.

Referring to FIG. 2, a second substrate 140 according to an embodiment of the present disclosure may include a plurality of first cavities 142, a plurality of second cavities 143, a first injection column 145, and a second injection column 146.

As shown in FIG. 2, the respective openings of the first cavity 142 and the second cavity 143, which are adjacent to each other, face different directions. For example, the first cavity 142 and the second cavity 143 may extend in a first direction, the first cavity 142 may have an opening in the first direction, and the second cavity 143 may have an opening in a second direction that is opposite to the first direction.

The first cavity 142 and the second cavity 143 adjacent to each other may be opened toward different injection columns. For example, as shown in FIG. 2, the first cavity 142 is open toward the first injection column 145, and the second cavity 143 is open toward the second injection column 146. The first injection column 145 and the second injection column 146 extend in a third direction, which crosses the first and second directions. As shown in FIG. 2, both the first injection column 145 and the second injection column 146 are perpendicular to the first direction that is the extending direction of both the first cavity 142 and the second cavity 143. However, in other embodiments, the first direction and the third direction might not be perpendicular to each other. In addition, in FIG. 2, only two first injection columns 145 and one second injection column 146 are shown due to limited space. However, the number first and second injection columns 145 and 146 is not limited to the above drawings. Thus, the number first and second injection columns 145 and 146 may be more or less as suitable.

The first injection column 145 and the second injection column 146 may have a width sufficient for injecting the quantum dots into the first cavity 142 and into the second cavity 143. For example, the width of each of the first injection column 145 and the second injection column 146 may be between about 10 μm and about 200 μm. As described in a manufacturing method of a display device to be described later, because the quantum dot to be injected into the first cavity 142 and the second cavity 143 is placed on the first injection column 145 and the second injection column 146, respectively, the width may be enough to inject the quantum dot into the cavity. When the width of each of the first injection column 145 and the second injection column 146 is less than about 10 μm, the quantum dot may not be sufficiently placed on the injection columns 145 and 146. In addition, when the width of each of the first injection column 145 and the second injection column 146 is more than about 200 μm, the area occupied by the injection columns 145 and 146 becomes excessively large, so that the resolution of the display device 100 may deteriorate. In addition, the insulating layer 144 is not formed on the first and second injection columns 145 and 146. This is because the quantum dot must be placed on the first injection column 145 and the second injection column 146 as described above.

Figure 3A:
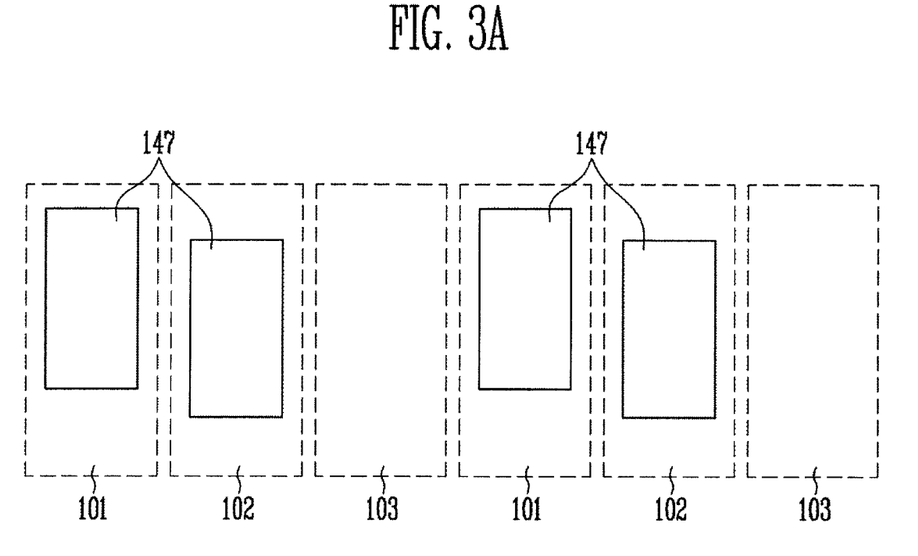
FIGS. 3A to 3C are plan views illustrating a second substrate according to an embodiment of the present disclosure.
Figure 3B:
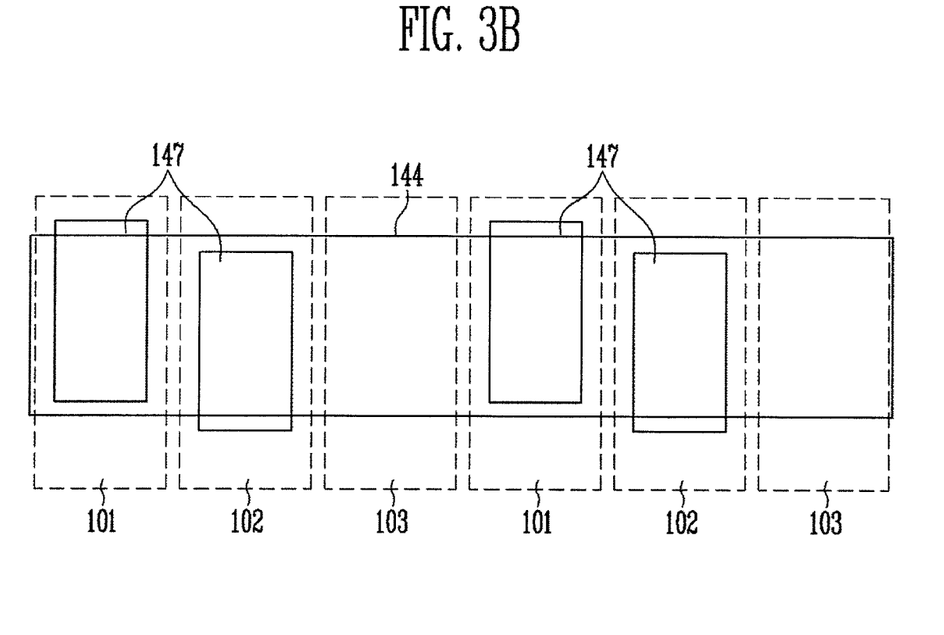
Figure 3C:
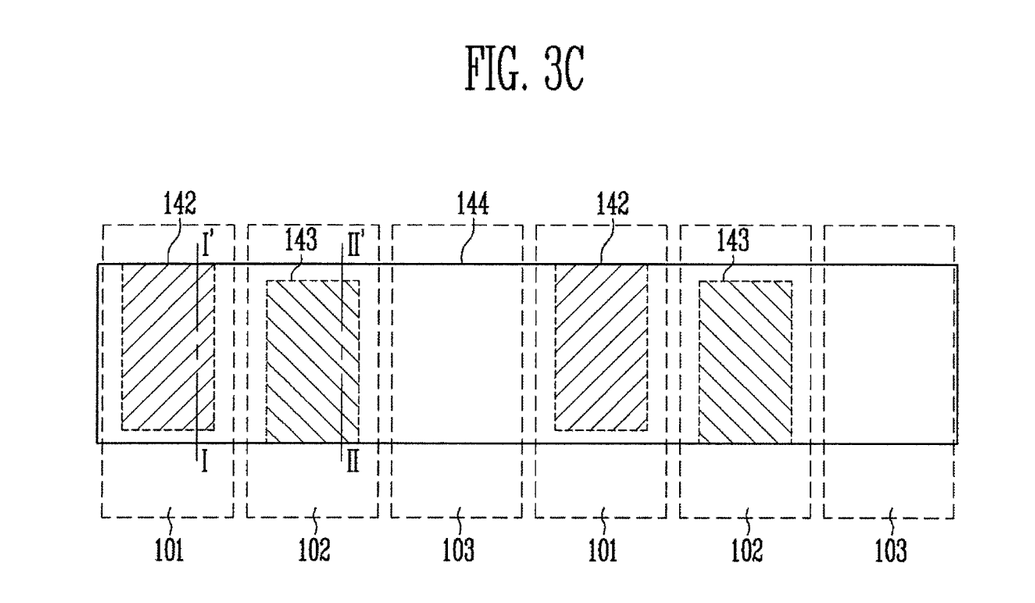
Figure 4A:
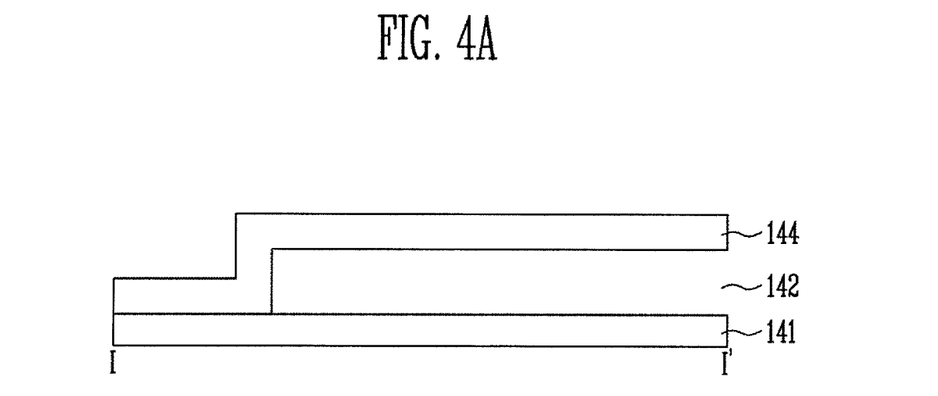
FIGS. 4A to 4B are cross-sectional views of FIG. 3C.
Figure 4B:
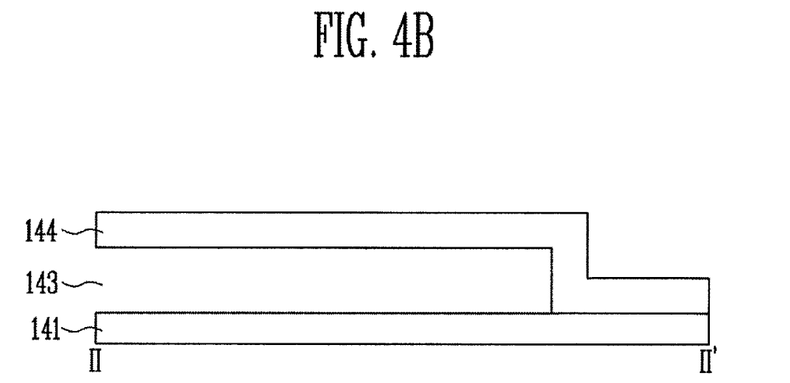

FIGS. 3A to 3C are plan views illustrating a second substrate according to an embodiment of the present disclosure. FIGS. 4A to 4B are cross-sectional views of FIG. 3C.

Hereinafter, a manufacturing method of a display device according to an embodiment of the present disclosure will be described with reference to FIGS. 1, 3A to 3C, and 4A to 4B. A manufacturing method of a display device according to an embodiment of the present disclosure includes providing a first substrate 120, providing a second substrate 140, and providing a liquid crystal layer 130 between the first substrate 120 and the second substrate 140.

The providing the first substrate 120 or the second substrate 140 may include providing a base substrate, forming an insulating layer that provides a first cavity and a second cavity having openings in different directions on the base substrate, providing a first quantum dot in the first cavity, providing a second quantum dot in the second cavity, and forming a cover layer covering the openings of the insulating layer on the insulating layer.

When the liquid crystal layer 130 is provided between the first substrate 120 and the second substrate 140, the liquid crystal layer 130 may be provided using an inkjet using a micropipette or vacuum liquid crystal injection apparatus. However, the method of providing the liquid crystal layer 130 is not limited thereto. Thus, an appropriate method to provide the liquid crystal layer 130 may be used.

Referring FIG. 1, the first cavity 142 and the second cavity 143 are provided on the second substrate 140. Therefore, the description will be made on the basis of the case where the cavity is provided in the second substrate 140. However, the first cavity 142 and the second cavity 143 may be provided on the first substrate 120.

Referring to FIGS. 1 and 3A, to provide the second substrate 140, a base substrate 141 is first prepared. A sacrificial layer 147 is stacked and patterned on the base substrate 141.

The sacrificial layer 147 is formed in a shape to form the first cavity 142 and the second cavity 143. Therefore, the sacrificial layer 147 may be patterned so that the first cavity 142 and the second cavity 143 may extend in the first direction, the first cavity 142 may have the opening in the first direction, and the second cavity 143 may have the opening in the second direction that is opposite to the first direction after the sacrificial layer 147 is removed. In addition, an end portion in the first direction of the sacrificial layer 147 and an end portion in the second direction of the sacrificial layer 147 may be different in the first pixel region 101 and in the second pixel region 102. The sacrificial layer 147 is not provided in the third pixel region 103. The sacrificial layer 147 may be patterned by photolithography.

Referring to FIG. 3B, an insulating layer 144 is formed on the sacrificial layer 147 after the sacrificial layer 147 is patterned. The insulating layer 144 is not formed on the first injection column 145 or on the second injection column 146, and is formed to cover the remaining portion except the end portion of the sacrificial layer 147, as described above.

Referring to FIG. 3C, the sacrificial layer 147 is removed after the insulating layer 144 is formed. The sacrificial layer 147 may be removed using a dry etch process or a wet etch process. As shown in FIGS. 4A and 4B, when the sacrificial layer 147 is removed, the space in which the sacrificial layer 147 is located becomes the first cavity 142 and the second cavity 143. The first cavity 142 may have the opening in the first direction, and the second cavity may have the opening in the second direction that is opposite to the first direction. The first cavity 142 and the second cavity 143 may be respectively opened toward the first injection column 145 and the second injection column 146, which extend in the third direction, and may be surrounded by the base substrate 141 and the insulating layer 144.

The first quantum dot and the second quantum dot are respectively injected into the first cavity 142 and the second cavity 143 through the openings. To this end, the first quantum dot is first placed on the first injection column 145. The first quantum dot on the first injection column 145 may be injected into the first cavity 142 by a capillary phenomenon. In this case, to promote the capillary phenomenon, the above injection process may be performed in a vacuum state, or may be performed together with a heating process. After the first quantum dot is injected into the first cavity 142, the second quantum dot is placed on the second injection column 146. The second quantum dot on the second injection column 146 may also be injected into the second cavity 143 by the capillary phenomenon. This process may also be performed in a vacuum or in a heated state.

As described in the injection process of the first quantum dot and the second quantum dot, according to an embodiment of the present disclosure, the first quantum dot and the second quantum dot are injected at positions that are different from each other. Therefore, there is no possibility that the first quantum dot and the second quantum dot are mixed in the process of injecting the first quantum dot and the second quantum dot into the first cavity 142 and into the second cavity 143, respectively.

In addition, because the first quantum dot and the second quantum dot are respectively in the first cavity 142 and the second cavity 143, which are completely separated from each other, there is no possibility that the first quantum dot and the second quantum dot are mixed after being injected. In addition, because the first quantum dot and the second quantum dot may be injected by the capillary phenomenon to respectively fill the first cavity 142 and the second cavity 143, there is little to no possibility that a printing volume of the quantum dot is less than intended.

In conventional methods, the quantum dot formed by the existing inkjet process may overflow during or after the inkjet process to cause color mixture. In addition, the printing volume of the quantum dot by the inkjet process may be less than intended, so that optical property may deteriorate. The manufacturing method of the display device according to an embodiment of the present disclosure does not have the above problems.

After the injection process of the first quantum dot and the second quantum dot, a cover layer 148 is stacked on the insulating layer 144. A light-blocking layer 151, an overcoat layer 152, and a window 153 may be formed on the second substrate 140. In addition, a light source 110 may be attached to the display device after the first substrate 120, the liquid crystal layer 130, and the second substrate 140 are formed.

The display device according to an embodiment of the present disclosure may be applied to various electronic devices. For example, the display device may be applied to a television, a notebook, a mobile phone, a smart phone, a smart pad, a PMP, a PDA, a navigation device, various wearable devices such as a smart watch, and the like.

While embodiments of the present disclosure have been shown and described with reference to certain embodiments thereof, it will be understood by those skilled in the art that various changes in forms and details may be made therein without departing from the spirit and scope of the present invention as defined by the appended claims and their equivalents.

Accordingly, the technical scope of the present disclosure may be determined by on the technical scope of the accompanying claims.

What is claimed is:

1. A display device comprising:
a light source;
a first substrate on the light source;
a liquid crystal layer on the first substrate; and
a second substrate on the liquid crystal layer,
wherein the first substrate or the second substrate comprises:
a base substrate;
an insulating layer on the base substrate, and partially defining a first cavity extending in a length direction, and a second cavity extending in the length direction and adjacent to the first cavity in a width direction that crosses the length direction, the first and second cavities having openings respectively facing opposite directions with respect to the length direction;
a first quantum dot in the first cavity;
a second quantum dot in the second cavity; and
a cover layer covering the openings of the first and second cavities.

2. The display device of claim 1, wherein the first substrate or the second substrate comprises a first pixel region, a second pixel region, and a third pixel region,
wherein the first cavity is in the first pixel region, and
wherein the second cavity is in the second pixel region.

3. The display device of claim 1, wherein the insulating layer comprises a plurality of injection columns extending in the width direction, and
wherein the first cavity and the second cavity are between adjacent ones of the injection columns.

4. The display device of claim 3, wherein the opening of the first cavity and the opening of the second cavity are directed to different ones of the injection columns.

5. The display device of claim 1, wherein the light source is configured to emit light having a first wavelength band,
wherein the first quantum dot is configured to absorb light having the first wavelength band and to emit light having a second wavelength band that is different from the first wavelength band, and
wherein the second quantum dot is configured to absorb light having the first wavelength band and to emit light having a third wavelength band that is different from the first wavelength band.

6. The display device of claim 5, wherein the first wavelength band is about 450 nm to about 495 nm,
wherein the second wavelength band is about 495 nm to about 570 nm, and
wherein the third wavelength band is about 620 nm to about 750 nm.

7. The display device of claim 1, wherein the insulating layer comprises a transparent photoresist layer.

8. The display device of claim 1, further comprising:
a light-blocking layer on the second substrate;
an overcoat layer on the light-blocking layer; and
a window on the overcoat layer.

* * * * *